United States Patent Office

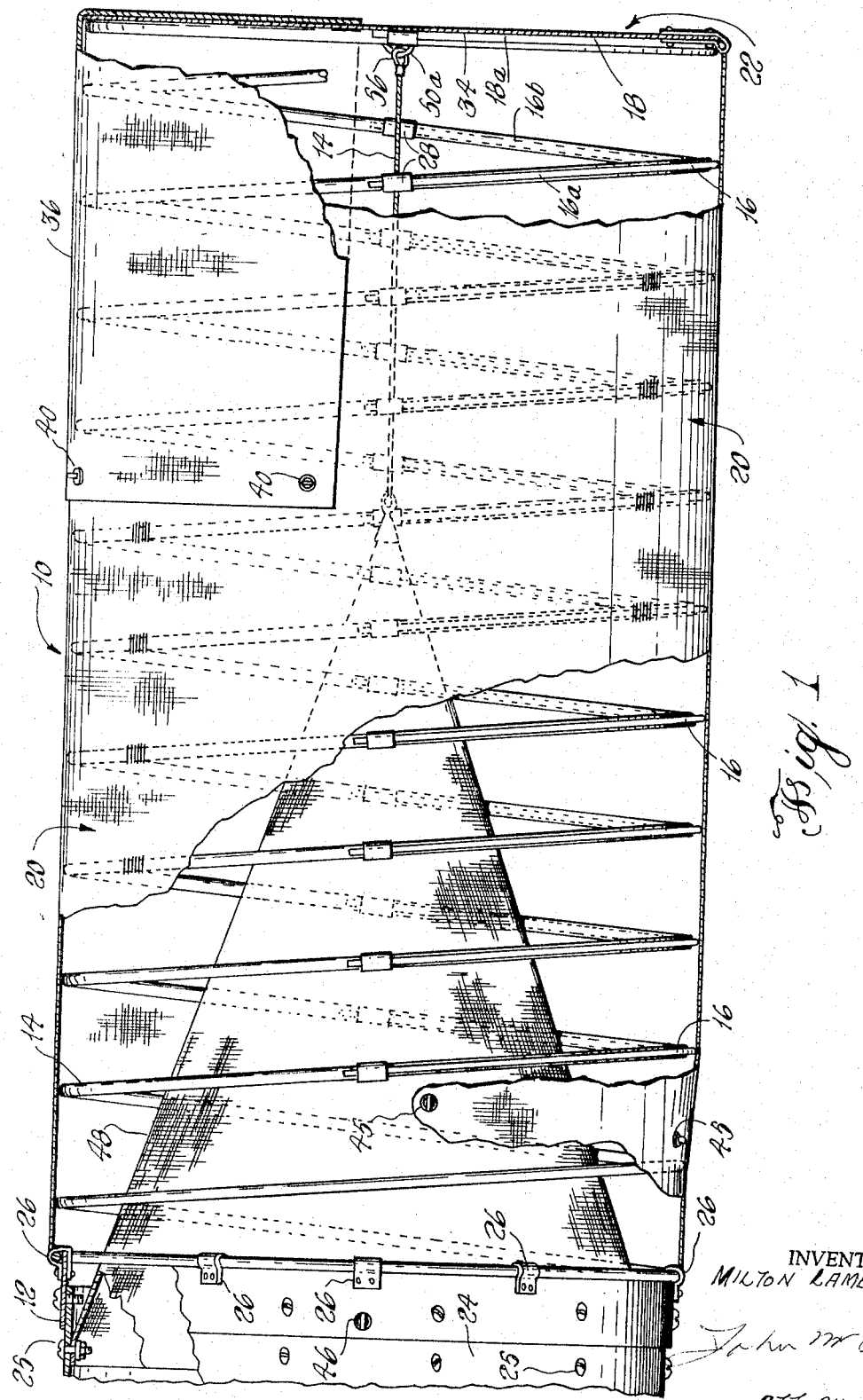

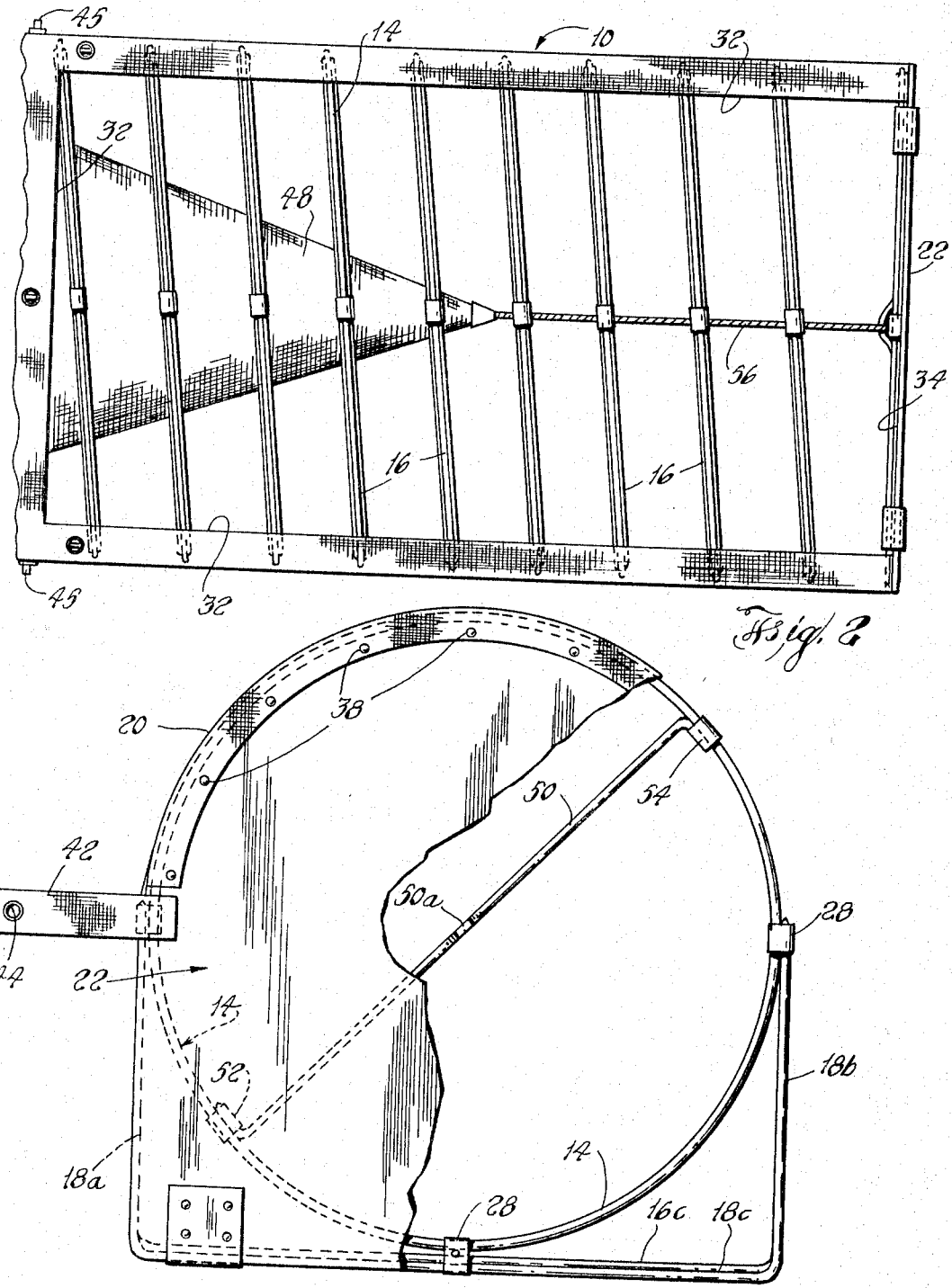

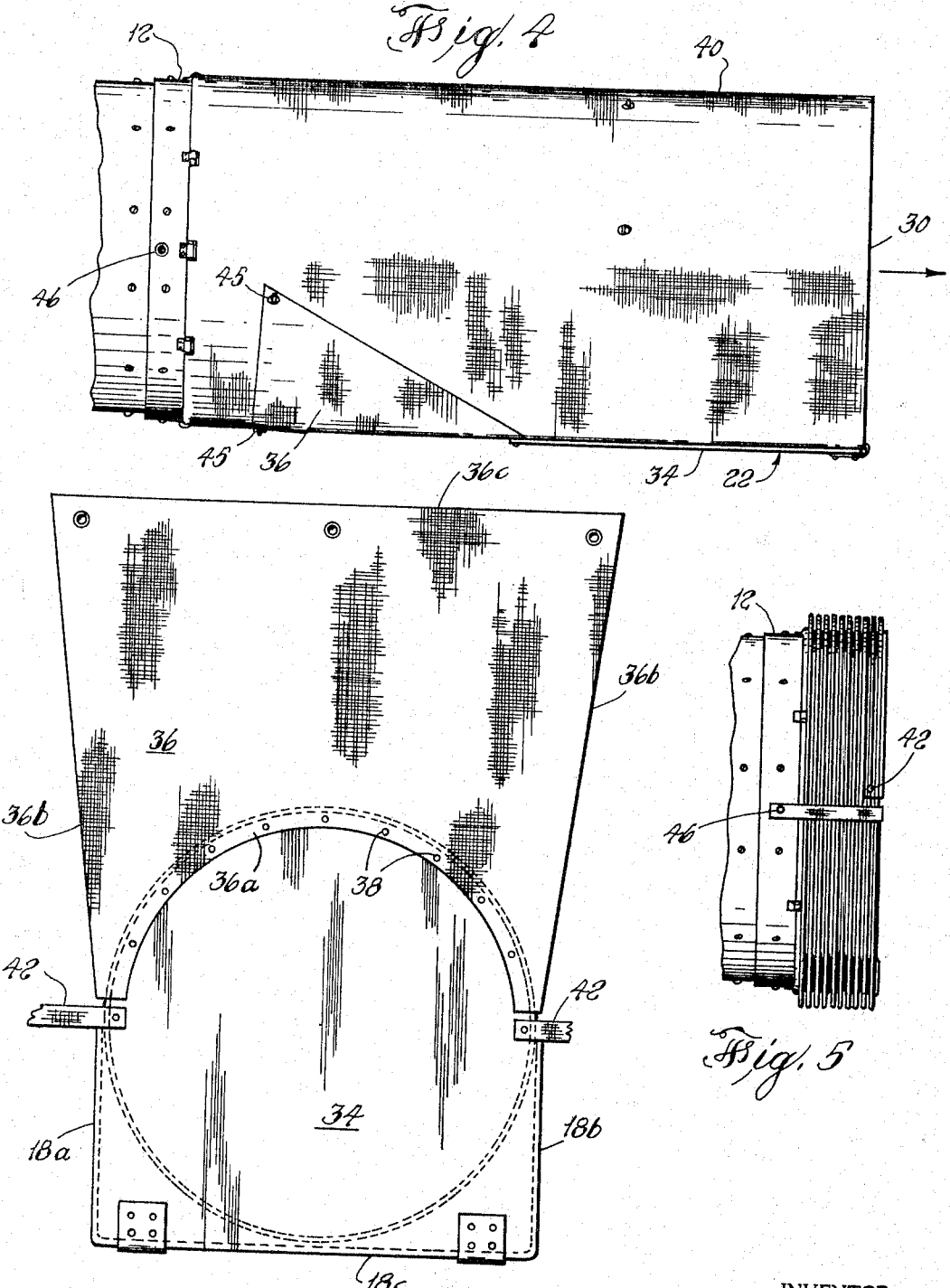

3,316,972
Patented May 2, 1967

3,316,972
RETRACTABLE HIGH EXPANSION FOAM DISCHARGE NOZZLE WITH SELECTIVELY CLOSEABLE SIDE AND END OPENINGS
Milton Lambert, 6236 Ellwell Crescent,
Rego Park, N.Y. 11374
Filed June 11, 1965, Ser. No. 463,407
10 Claims. (Cl. 169—15)

The invention described herein may be manufactured and used by or for the Government of the United States of America for governmental purposes without the payment of any royalties thereon or therefor.

This invention relates to apparatus for producing foam for extinguishing fire, and more particularly to an improved foam nozzle in which the foam produced is collected and discharged into the atmosphere.

In the past, no satisfactory means have been disclosed for discharging large quantities of foam through a nozzle adapted to alternate vertical or horizontal discharge. Prior attempts to provide such a nozzle have been unsatisfactory for one or more reasons including inefficiency of discharge, excessive bulk in storage and difficulty in manual operation.

An object of this invention is to provide a foam nozzle that is light in weight, portable, easily operable manually and efficient in operation.

A further object is to provide a foam nozzle capable of selective horizontal and vertical discharge of large quantities of foam without manually bending or directing the nozzle in operation.

Another object is to provide a foam nozzle which is extensible for operation and contractable for minimum storage bulk.

A still further object is to provide a nozzle for selective vertical and horizontal discharge of foam which is simple and readily adaptable to low cost manufacturing methods.

A further object is to provide a foam nozzle in which the screen portion thereof is automatically positioned for operation upon extension of the foam nozzle.

In carrying out the preferred form of the invention it has been found practical to provide a collapsible frame in the form of a helical spring, normal in extended position, and cooperatively arranged U-shaped rods attached to spaced coils of the spring together with a covering for the frame leaning end and side discharge openings and a common hinged closing cover for selectively closing the respective openings, means also being provided for securing the frame in contracted condition of the spring for compact storage.

Other objects and advantages will be apparent to those skilled in the art from reference to the attached description of a preferred embodiment of the invention and from reference to the accompanying drawings wherein:

FIG. 1 is a side elevational view of a preferred nozzle embodying the invention with portions of the covering removed to expose the frame structure and in extended operating position of the frame.

FIG. 2 is a bottom view of the device of FIG. 1, with the upper portions of helical spring omitted to avoid confusion in reading the drawing, FIG. 3 is an elevational view of the discharge end of the device of FIG. 1, FIG. 4 is a side elevational view of the device of FIG. 1 with the end enclosure member in closed position on the side discharge opening, FIG. 5 is a side elevational view of the device of FIG. 1 in contracted stored condition, and FIG. 6 is a detailed view showing the closure member of the device.

Referring to FIGS 1, 2 and 3 of the drawing the preferred form of the foam nozzle is indicated generally at 10 and is seen to comprise an adapter 12, a helical spring 14 normal in extended position, U-shaped frame members indicated at 16, and 18 a flexible covering indicated generally at 20 and a closure member indicated generally at 22.

The adapter 12 is a support conduit or housing connected to the intake end of the spring 14 and adapted for connection to a foam generator (not shown) to support the spring and to pass foam from the generator through the spring which as will be described forms the main body of an extendable frame of the nozzle. Normally a simple ring preferably of aluminum is used for the adapter 12, the ring being formed with apertures 24 and provided with screen 25 or other suitable means to secure the ring to the foam generator (not shown). The ring is also provided with fasteners 26 mounting the ring to the first coil of the intake end of the spring 14.

U-shaped frame members 16 and 18 are formed of leg portions 16a, 16b, 18a and 18b as indicated and straight intermediate sections 16c and 18c and are attached in aligned relation to adjacent coils of the spring 14 by clips 28 or other suitable means.

The object in providing the spaced members 16 is to provide in the extended position of the spring 14 a broad side passageway of substantially rectilinear cross-section by way of the leg portions 16a and 16b of the U-shaped members 16, to provide a frame or backstop by way of the intermediate sections 16c of the members to engage a flat closure member 22 and to accomplish the above without interfering with complete contraction, that is, closing of the helical spring for compact storage of the nozzle as will be described.

The object of providing the frame member 18 is to provide a pivotal support for the closure member 22 as will be described.

The flexible covering 20 is preferably of aluminized cloth fixed as by stitching as indicated or other suitable means to the spring 14 and frame members 16 and 18 to cover all of the frame (including the spring) except for the discharge and opening indicated at 30 in FIG. 4 and the planar area between the intermediate sections 16c of the U-shaped members 16 which area forms the side discharge opening, 32, best seen in FIG. 2.

It is to be noted that the number of frames 16 is a matter of choice. A minimum of two is required to provide backing for the closure plate and support for the side walls adjacent the side discharge opening indicated at 32. The provision of a frame 16 on each adjacent coil provides rigidity to the side walls and firm backing for the closure plate 22.

To selectively close the end opening 30 or the side opening 32, the pivoted closure member 22 is provided. Closure 22 could be simply a pivoted plate of sufficient area to cover each discharge opening and with provisions for securing the plate selectively over the respective openings. However, to provide a better seal at each opening and a more compact nozzle in storage position, a plate 34 and flexible skirt 36 is provided. (See FIGS. 4 and 6.)

As shown in FIG. 6, the plate 34 is formed rectangular in its lower half portion, corresponding to the dimensions of frame 18, and semicircular in its upper half portion, corresponding to the connection of the upper half of the spring 14. Thus, the plate 34 completely closes the end discharge opening 30 of the nozzle.

The flexible skirt on flap 36 is preferably of aluminized cloth cut in semicircular form at 36a to overlap the curved edge of plate 34 and is secured to the plate 34 by flat head aluminum semitubular rivets 38 or other suitable means. The sides 36b of the flap 36 are diverging and terminate in a straight linear edge 36c of the flap.

As shown in FIG. 1 when the end discharge opening 0 is closed the flap 36 is laid over the outer covering 20 and secured thereto by cinch fasteners 40 or other suitable means. In this closed position of the closure 22 and extended position of the nozzle, the nozzle is in operating condition for vertical discharge of foam from the bottom side discharge passage 32. With the closure 22 in the same position the spring 14 may be closed as shown in FIG. 5 for minimum bulk in storage. Closing of the spring 14 closes the side discharge opening 32. Straps 42 secured to opposite sides of the plate 34 by rivets or other suitable means and having attached eyelets 44 are provided for attachment to studs 46 (see FIG. 1) secured to opposite sides of the adapter ring 12 to hold the nozzle in contracted stored condition. (See FIG. 5.) Any other suitable means such as hooks (not shown) and eye fasteners (not shown) could also be used.

When it is desired to discharge foam horizontally through end opening 30, the plate 34 and flap 36 are swung to the horizontal position shown in FIG. 4 to close the side opening 32. In this position since the side opening 32 is preferably longer than the end opening 30, part of the side opening 32 is covered by the plate 34 and the remainder is covered by the flap 36 which is wrapped over the cover 20 and secured thereto by cinch fasteners 45.

High expansion foam generators conventionally employ a flexible screen for the purpose of developing the foam. Conventionally such a screen requires manual manipulation to proper operating position. However, it is a feature of the subject invention to provide for automatic positioning of a screen, as identified by numeral 48 in FIGS. 1 and 2, by action of the spring 14 as it expands. This is accomplished by providing a cross rod 50 (see FIG. 3) positioned along a diameter of the end coil at the discharge end of the coil 14 and secured thereto by suitable means as for example clips 52 and 54. The rod 50 is formed with a U-shaped section 50a at the center thereof to receive a hook type flexible thong 56 (see FIGS. 1 and 2) fastened to the free end of the screen 48. The advantage of this arrangement is that as soon as the spring 14 is released by unsnapping the straps 42 the spring 14 leaps to its extended operating position and carries the free end of the screen 48 with it to place the screen also in proper extended operating position.

It is to be understood that the various dimensions of the nozzle may be varied to suit the application and the rate of foam discharge required. However, to appraise the reader of the general dimensions involved in the preferred device described above in order that the advantages of the invention be better understood, the following particulars will be of interest. The spring 14 is formed of hand drawn steel of wire diameter 0.187 inch, the inside coil diameter being about 17 inches and the free length of the spring about 33 inches. In its contracted stored position, the length of the nozzle exclusive of the length of the adapter is about 3 to 6 inches. The adapter itself is about 2 inches in width. Thus, the total storage length of nozzle is less than 6 inches and its total extended length about 35 inches.

In operation it is necessary only to simultaneously unsnap the straps 42 and the apparatus immediately and automatically assumes position for vertical discharge of foam. The nozzle may be set adjacent an open hatch in a ship and the edge portion between frames 16 and 18 utilized for manual or shored support of the free end of the nozzle. For horizontal discharge of foam the closure flap 36 is unsnapped, the closure pivoted to close the side discharge opening 32 and the flap snapped to the fastenings 45. The unit is then in position for horizontal discharge of foam. No bending of the nozzle is required. Bending at right angles for vertical discharge would require at least twice the length of nozzle and would require some means for holding the nozzle in the angled position. No handling of the foam screen 48 is required. Its positioning for operation and retraction is automatic.

It will be understood that various changes in the details, materials and arrangements of parts, which have been herein described and illustrated in order to explain the nature of the invention may be made by those skilled in the art within the principle and scope of the invention as expressed in the appended claims. In particular, it is to be noted that while the closure means is preferably made, as described, the entire closure could be made of one flexible piece rather than a plate and a flexible flap.

I claim:

1. A foam discharge nozzle comprising:
   an open ended frame extendable to elongated operating position and retractable to minimum bulk storage position,
   said frame being covered with a flexible material except for the open ends thereof, one end serving as an intake for foam development materials and the other end serving as an end discharge opening for said foam, and except for an area adjacent said end discharge opening serving as a side discharge opening,
   a common closure means supported on said frame manually displaceable to selectively close said end discharge opening and said side discharge opening, and
   foam developing screen means supported within said covered frame adjacent said intake end to develop foam.

2. A foam discharge nozzle according to claim 1 said side discharge opening being developed by relative movement of uncovered side portions of said frame during extension of said frame.

3. A foam discharge nozzle according to claim 2 said covered frame being shaped to form planar end and side discharge openings suitable for closing by a flat plate,
   said common closure means comprising a flat closure plate which by being positioned over said end opening in the inoperative contracted position of said frame permits minimum storage length of said nozzle.

4. A foam discharge nozzle according to claim 1,
   said foam developing screen means including a collapsible screen mesh having an open intake end connected to the intake end of said frame and a closed discharge end, and
   an elastic thong connected to the closed end of said screen and to the discharge opening end of said extensible frame to automatically position said screen mesh in extended operating position when said nozzle frame is extended to operating position.

5. A foam discharge nozzle according to claim 2,
   said foam developing screen means including a collapsible screen mesh having an open intake end connected to the intake end of said frame and a closed discharge end, and
   an elastic thong connected to the closed end of said screen and to the discharge opening end of said extensible frame to automatically position said screen mesh in extended operating position when said nozzle frame is extended to operating position.

6. A foam discharge nozzle according to claim 3,
   said foam developing screen means including a collapsible screen mesh having an open intake end connected to the intake end of said frame and a closed discharge end, and
   an elastic thong connected to the closed end of said screen and to the discharge opening end of said extensible frame to automatically position said screen mesh in extended operating position when said nozzle frame is extended to operating position.

7. An expansion foam discharge nozzle comprising,
   a helical spring normally in extended position,
   a plurality of framing elements fixed respectively to selected coils adjacent a foam discharge end of said spring to form spaced side supports and spaced bottom supports,
   one of said bottom supports being fixed to the end coil adjacent said foam discharge end of said spring,
a flexible material attached to said spring and to said side supports to enclose all sides of said spring except for a bottom discharge area located between said spaced bottom supports,
a common closure means pivoted to said one bottom support to swing in one direction to close the discharge end opening of said spring and swingable in the opposite direction to alternately close said bottom discharge area,
a supporting conduit connected to the other end of said spring and adapted for connection to a foam generator to support said spring and to pass foam from said generator to said discharge openings,
means for securing said spring in closed contracted position against said support conduit when not in use, and
foam developing screen means supported within said covered spring adjacent said other end of said spring.

8. An expansion foam discharge nozzle comprising,
a helical spring normal in extended position,
a plurality of U-shaped rods each having a straight intermediate section and substantially parallel legs,
said rods being fixed respectively to adjacent coils in said spring adjacent to one end thereof with the intermediate section of said rods in a common plane,
a sleeve of flexible material enclosing all of said spring except the open ends and the common plane area in which the intermediate sections of said rods are located,
a closure means pivotally supported from the end of said spring adjacent said U-shaped rods and dimensioned to close the opening in said one end of said spring and alternatively to close said common plane area,
a supporting conduit connected to the other end of said spring and adapted for connection to a foam generator to support said spring and to pass foam from said generator through said sleeve and coil spring,
means for securing said spring in closed contracted position against such support conduit when not in use, and
foam developing screen means supported within said covered spring adjacent said other end of said spring.

9. A foam discharge nozzle according to claim 7,
said foam developing screen means including a collapsible screen mesh having an open intake end connected to the intake end of said frame and a closed discharge end, and
an elastic thong connected to the closed end of said screen and to the discharge opening end of said extensible frame to automatically position said screen mesh in extended operating position when said nozzle frame is extended to operating position.

10. A foam discharge nozzle according to claim 8,
said foam developing screen means including a collapsible screen mesh having an open intake end connected to the intake end of said frame and a closed discharge end, and
an elastic thong connected to the closed end of said screen and to the discharge opening end of said extensible frame to automatically position said screen mesh in extended operating position when said nozzle frame is extended to operating position.

References Cited by the Examiner
UNITED STATES PATENTS

| | | | |
|---|---|---|---|
| 2,597,913 | 5/1952 | Webster | 169—15 XR |
| 2,839,334 | 6/1958 | Lacks et al. | 239—443 |
| 2,894,694 | 7/1959 | Lacks et al. | 169—15 |
| 3,065,797 | 11/1962 | Barnes | 169—15 |
| 3,080,891 | 3/1963 | Duff | 138—122 |

M. HENSON WOOD, Jr., *Primary Examiner.*

V. M. WIGMAN, *Assistant Examiner.*